(12) United States Patent
Kapinos et al.

(10) Patent No.: US 10,555,011 B2
(45) Date of Patent: Feb. 4, 2020

(54) APPARATUS, METHOD, AND PROGRAM PRODUCT FOR DISPLAYING VIDEO INPUTS

(71) Applicant: LENOVO (Singapore) PTE. LTD., New Tech Park (SG)

(72) Inventors: Robert James Kapinos, Durham, NC (US); Timothy Winthrop Kingsbury, Cary, NC (US); Scott Wentao Li, Cary, NC (US); Russell Speight VanBlon, Raleigh, NC (US)

(73) Assignee: LENOVO (SINGAPORE) PTE. LTD. (SG)

( * ) Notice: Subject to any disclaimer, the term of this patent is extended or adjusted under 35 U.S.C. 154(b) by 0 days.

(21) Appl. No.: 15/630,576

(22) Filed: Jun. 22, 2017

(65) Prior Publication Data

US 2018/0376172 A1    Dec. 27, 2018

(51) Int. Cl.
*H04N 5/46* (2006.01)
*H04N 21/2343* (2011.01)
*G06F 21/32* (2013.01)
*G06K 9/00* (2006.01)
*H04N 5/775* (2006.01)
*H04N 5/445* (2011.01)

(52) U.S. Cl.
CPC ......... *H04N 21/2343* (2013.01); *G06F 21/32* (2013.01); *G06K 9/00288* (2013.01); *H04N 5/7755* (2013.01); *H04N 5/44508* (2013.01)

(58) Field of Classification Search
CPC .................. H04N 21/2343; H04N 21/816
USPC ..... 348/705, 706, 553, 552, 555, 558, 423.1
See application file for complete search history.

(56) References Cited

U.S. PATENT DOCUMENTS

| 2003/0081934 | A1* | 5/2003 | Kirmuss | ................. | B60R 11/02 |
|---|---|---|---|---|---|
| | | | | | 386/224 |
| 2007/0250853 | A1* | 10/2007 | Jain | ........................ | H04H 60/45 |
| | | | | | 725/28 |
| 2017/0105053 | A1* | 4/2017 | Todd | .................... | H04N 21/816 |

* cited by examiner

*Primary Examiner* — Jefferey F Harold
*Assistant Examiner* — Jean W Desir
(74) *Attorney, Agent, or Firm* — Kunzler Bean & Adamson

(57) ABSTRACT

Apparatuses, methods, and program products are disclosed for displaying video inputs. One apparatus includes a display, a processor, and a memory that stores code executable by the processor. The code is executable by the processor to receive, by use of the processor, multiple video inputs. The code is executable by the processor to determine display criteria of each video input of the multiple video inputs based on user selection. The code is executable by the processor to display, by use of the display, each video input of the multiple video inputs based on the display criteria of the respective video input.

9 Claims, 6 Drawing Sheets

APPARATUS, METHOD, AND PROGRAM PRODUCT FOR DISPLAYING VIDEO INPUTS

FIELD

The subject matter disclosed herein relates to displaying video and more particularly relates to displaying multiple video inputs on a display.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. Performing various actions, such as displaying different video inputs, may be difficult to perform on a display, such as a television.

BRIEF SUMMARY

An apparatus for displaying video inputs is disclosed. A method and computer program product also perform the functions of the apparatus. In one embodiment, the apparatus includes a display, a processor, and a memory that stores code executable by the processor. The code, in various embodiments, is executable by the processor to receive, by use of the processor, multiple video inputs. The code, in some embodiments, is executable by the processor to determine display criteria of each video input of the multiple video inputs based on user selection. The code, in certain embodiments, is executable by the processor to display, by use of the display, each video input of the multiple video inputs based on the display criteria of the respective video input.

In some embodiments, the code executable by the processor receives a video input from a digital video input, an analog video input, a tunable input, a data transport interface, a program input, and/or a notification input. In one embodiment, the code executable by the processor determines a display position, a display size, an order, a transparency, and/or a visibility.

In another embodiment, the apparatus includes a multiplexer that combines the multiple video inputs for display. In some embodiments, the memory stores the display criteria for the multiple video inputs corresponding to a user.

A method for displaying video inputs, in one embodiment, includes receiving, by use of a processor, multiple video inputs. In a further embodiment, the method includes determining display criteria of each video input of the multiple video inputs based on user selection. In certain embodiments, the method includes displaying each video input of the multiple video inputs on a display based on the display criteria of the respective video input.

In some embodiments, receiving the multiple video inputs includes receiving a video input from a digital video input, an analog video input, a tunable input, a data transport interface, a program input, and/or a notification input. In various embodiments, determining the display criteria of each video input of the multiple video inputs based on user selection includes determining a display position, a display size, an order, a transparency, and/or a visibility. In one embodiment, the method includes combining the multiple video inputs via a multiplexer for display.

In some embodiments, the method includes storing the display criteria for the multiple video inputs corresponding to a user. In certain embodiments, the method includes detecting the user and displaying the multiple video inputs based on the stored display criteria corresponding to the user. In such embodiments, detecting the user includes detecting the user via a camera. In some embodiments, detecting the user includes detecting the user via user authentication. In various embodiments, determining the display criteria of each video input of the multiple video inputs based on user selection includes determining the display criteria based on historical data corresponding to user selections.

In one embodiment, a program product includes a computer readable storage medium that stores code executable by a processor. The executable code, in certain embodiments, includes code to perform receiving, by use of a sensor, multiple video inputs. The executable code, in some embodiments, includes code to perform determining display criteria of each video input of the multiple video inputs based on user selection. The executable code, in various embodiments, includes code to perform displaying each video input of the multiple video inputs on a display based on the display criteria of the respective video input.

In certain embodiments, the executable code includes code to perform receiving a video input from a digital video input, an analog video input, a tunable input, a data transport interface, a program input, and/or a notification input. In various embodiments, the executable code includes code to perform storing the display criteria for the multiple video inputs corresponding to a user.

In one embodiment, the executable code includes code to perform detecting the user and displaying the multiple video inputs based on the stored display criteria corresponding to the user. In certain embodiments, the executable code includes code to perform detecting the user via a camera. In various embodiments, the executable code includes code to perform detecting the user via user authentication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
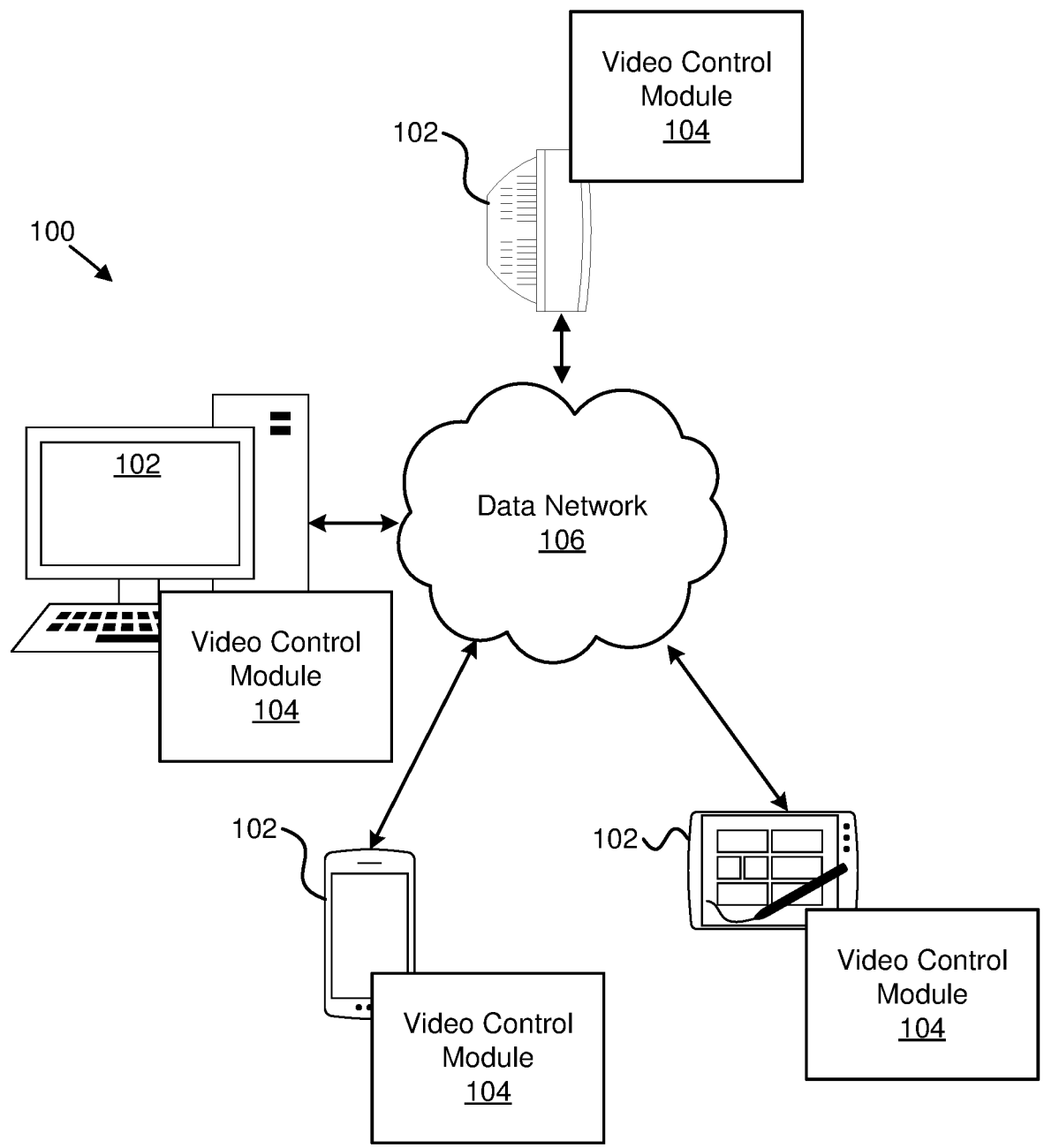
FIG. 1 is a schematic block diagram illustrating one embodiment of a system for displaying video inputs.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for displaying video inputs. In one embodiment, the system 100 includes information handling devices 102, video control modules 104, and data networks 106. Even though a specific number of information handling devices 102, video control modules 104, and data networks 106 are depicted in FIG. 1, one of skill in the art will recognize that any number of information handling devices 102, video control modules 104, and data networks 106 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the video control module 104. In certain embodiments, the video control module 104 may receive, by use of a processor, multiple video inputs. The video control module 104 may also determine display criteria of each video input of the multiple video inputs based on user selection. The video control module 104 may display, by use of a display, each video input of multiple video inputs based on the display criteria of the respective video input. In this manner, the video control module 104 may be used for displaying video inputs.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
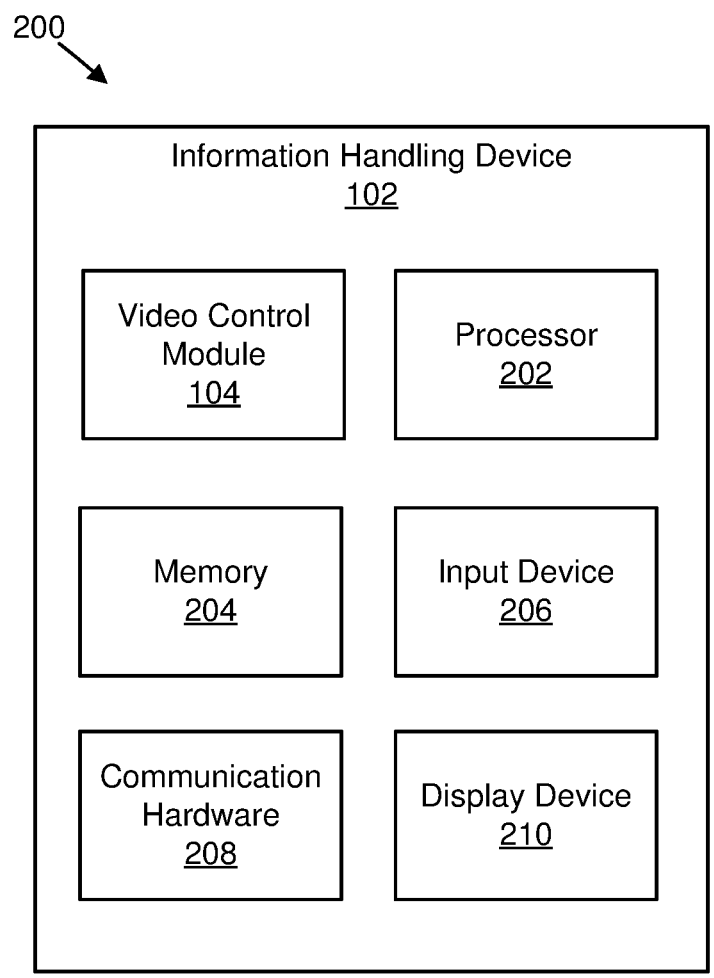
FIG. 2 is a schematic block diagram illustrating one embodiment of an apparatus including an information handling device.

FIG. 2 depicts one embodiment of an apparatus 200 that may be used for displaying video inputs. The apparatus 200 includes one embodiment of the information handling device 102. Furthermore, the information handling device 102 may include the video control module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the video control module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to displaying video inputs. In some embodiments, the memory 204 also stores program code and related data, such as an operating system or other controller algorithms operating on the information handling device 102.

The information handling device 102 may use the video control module 104 for displaying video inputs. As may be appreciated, the video control module 104 may include computer hardware, computer software, or a combination of both computer hardware and computer software. For example, the video control module 104 may include circuitry, or a processor, used to receive, by use of the processor 202, multiple video inputs. As another example, the video control module 104 may include computer program code that determines display criteria of each video input of the multiple video inputs based on user selection. As a further example, the video control module 104 may include computer program code that displays, by use of the display device 210, each video input of the multiple video inputs based on the display criteria of the respective video input.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the video control module 104.

Figure 3:
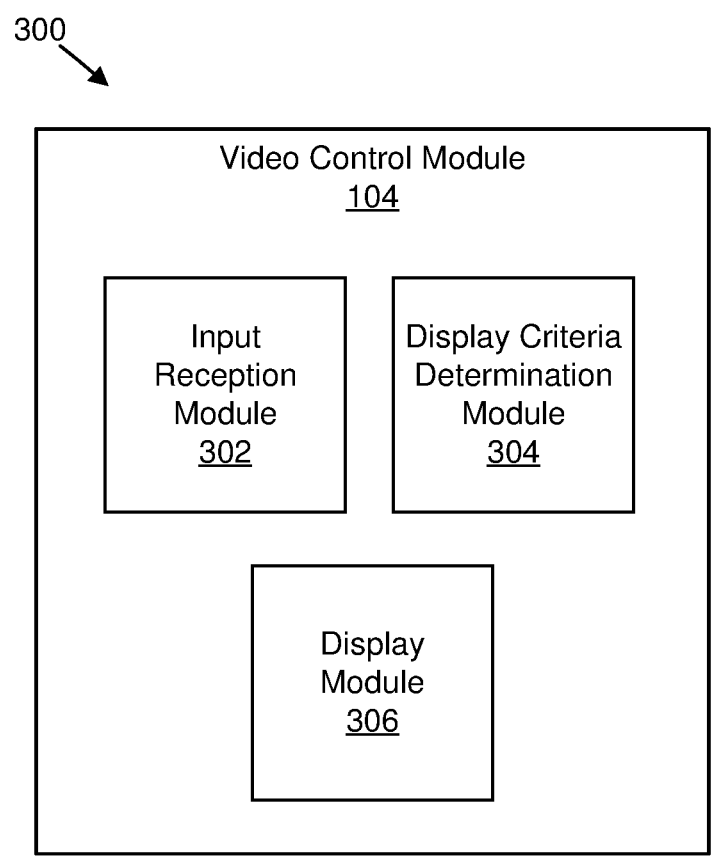
FIG. 3 is a schematic block diagram illustrating one embodiment of an apparatus including a video control module.

FIG. 3 depicts a schematic block diagram illustrating one embodiment of an apparatus 300 that includes one embodiment of the video control module 104. Furthermore, the video control module 104 includes an input reception module 302, a display criteria determination module 304, and a display module 306.

In certain embodiments, the input reception module 302 may receive, by use of a processor (e.g., the processor 202), multiple video inputs. In some embodiments, the input reception module 302 may receive the multiple video inputs via a video input from a digital video input, an analog video input, a tunable input, a data transport interface, a program input, and/or a notification input.

In various embodiments, the digital video input may include a high-definition multimedia interface ("HDMI") port, a display port ("DisplayPort"), a digital video interface ("DVI-D"), a universal serial bus ("USB"), a FireWire® (e.g., IEEE 1394), and/or a ThunderBolt™. In certain embodiments, the analog video input may include a video graphics adapter ("VGA"), a digital video interface ("DVI-A"), a composite video, a component video, Syndicat des Constructeurs d'Appareils Radiorécepteurs et Téléviseurs ("SCART") input, and/or an s-video input.

In some embodiments, the tunable input may include any suitable channel that uses a tuner to obtain a video signal, such as using a coaxial radio frequency ("RF") connector (e.g., an F connector), a Belling-Lee (e.g., IEC 61169-2) connector, a subminiature version B ("SMB") connector, and/or a dipole attachment. In various embodiments, the data transport interface (e.g., streaming input) may include any suitable interface that may deliver free form data that may be video or anything else, such as a wired network, a wireless network (e.g., WiFi®), a 2G network, a 3G network, a 4G network, and/or another network.

In certain embodiments, the program input may include anything that renders full screen video information by an internal process instead of sending it to a device by a transport, such as a browser, a game, an application, and/or a service (e.g., Netflix®). In some embodiments, a notification input may include any data that may be expected to be formatted and may be overlaid onto other content, such as a subtitle, an emergency alert, a voice to text transcription, closed captioning information, and/or other information.

In various embodiments, the input reception module 302 may receive the multiple video inputs via a single port, while, in other embodiments, the input reception module 302 may receive the multiple video inputs via multiple ports. In one embodiment, the input reception module 302 may be configured to receive at least one video input per input port. In certain embodiments, video inputs may receive video data with embedded information that may be separated into a distinct information input and/or a distinct streaming input thereby providing multiple input streams from a single video input.

In one embodiment, a multiplexer of the apparatus 300 may multiplex the multiple video inputs. In certain embodiments, the multiplexer may facilitate scaling and/or mixing a number of video input streams. In some embodiments, the multiple video input streams may be routed to the multiplexer instead of directly to the display device 210. The multiplexer may manage, via software and/or hardware, which video input streams are directed to the display device 210 and various properties corresponding to the video input stream (e.g., size, position, overlap, transparency, visibility, etc.). In certain embodiments, a window may be associated with each video input. In various embodiments, the apparatus 300 may include a demultiplexer (or decoder) that may facilitate reading, decoding, and/or extracting metadata and/or other information (e.g., sideband information) embedded in video streams so that those items may be displayed separate from their corresponding video streams. For example, metadata and/or other information may be displayed in a window separate from a corresponding video stream.

In one embodiment, the display criteria determination module 304 determines display criteria of each video input of the multiple video inputs based on user selection. For example, a user may select and/or determine the display criteria for each video input of the multiple video inputs. In various embodiments, the display criteria determination module 304 may determine a display position, a display size, an order (e.g., z-order), a transparency, a window, an orientation, and/or a visibility based on user selection and/or using a window manager. In certain embodiments, the display criteria determination module 304 may determine display criteria based on historical data corresponding to user selections. For example, the display criteria for one video input may be predicted based on prior user selections for another video input. As another example, the display criteria for a video input may be predicted based on past selections for the video input. In some embodiments, the display criteria determination module 304 may facilitate individually retrieving and/or dismissing a video input being viewed without impacting other video inputs being viewed. In some embodiments, the display criteria determination module 304 may contain logic, such as a window management logic and/or a video transparency logic.

In various embodiments, the display module 306 may display each video input of multiple video inputs on a display (e.g., the display device 210) based on the display criteria of the respective video input. In some embodiments, the display module 306 may display one or more video inputs at the same time.

In some embodiments, the video control module 104 stores display criteria for multiple video inputs corresponding to a user. In certain embodiments, the video control module 104 detects a user and displays multiple video inputs based on stored display criteria corresponding to the user. In such embodiments, detecting the user may include detecting the user via a camera. In some embodiments, detecting the user may include detecting the user via user authentication (e.g., password authentication).

In certain embodiments, the video control module 104 may receive commands from an input control device (e.g., remote control, keyboard, mouse, etc.). The commands from the input control device may be used to select a video input, control properties of video inputs (e.g., size, position, overlap, transparency, visibility, etc.), and/or provide controls to corresponding to video inputs (e.g., volume control, channel selection, streaming selection, menu navigation, recording controls, playback controls, picture-in-picture controls, etc.). In some embodiments, the video control module 104 may route controls corresponding to a video input from the input control device to a selected video input. In various embodiments, the video control module 104 may route controls corresponding to a video input from the input control device to the video input without the video input being selected.

Figure 4:
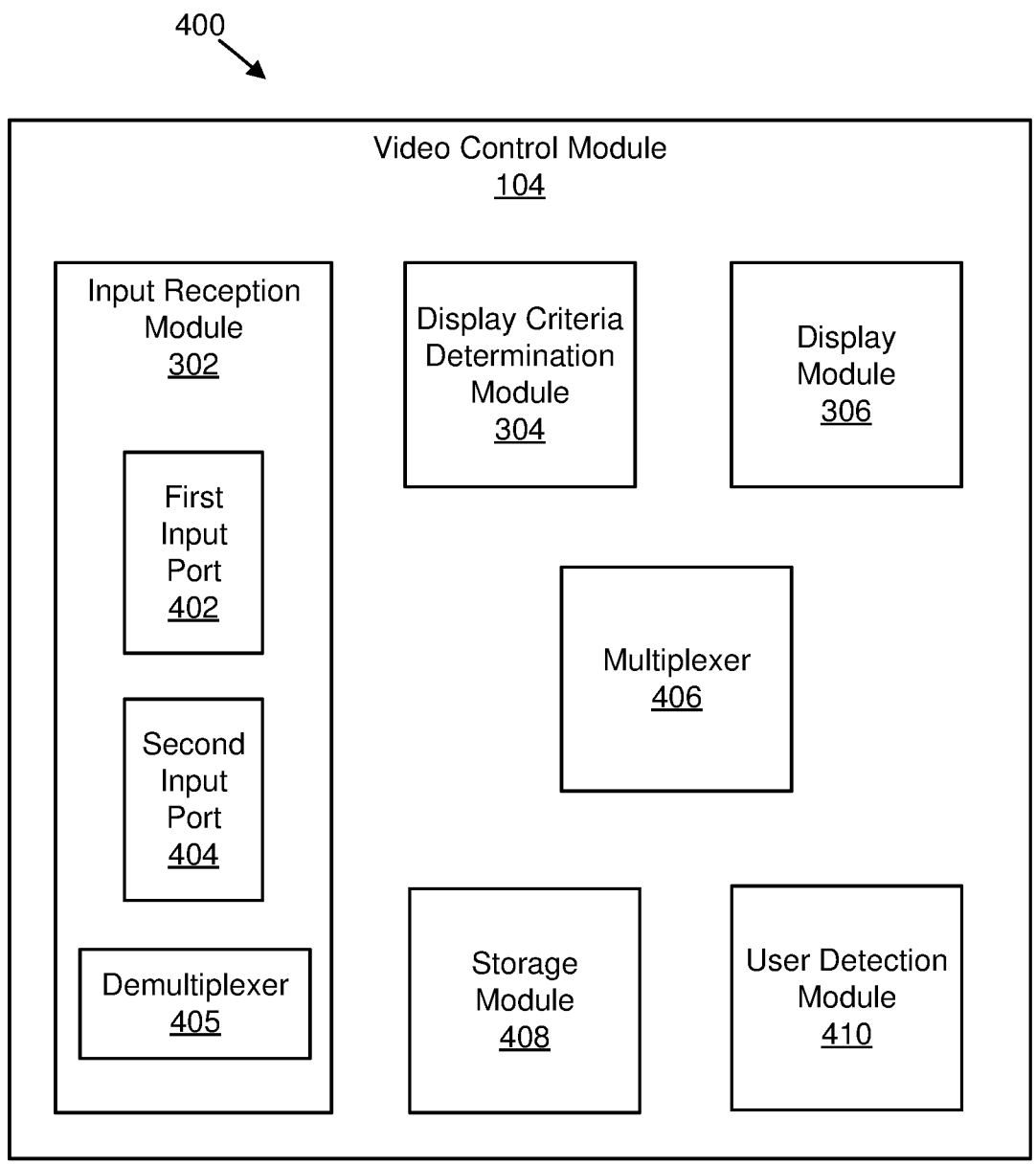
FIG. 4 is a schematic block diagram illustrating another embodiment of an apparatus including a video control module.

FIG. 4 is a schematic block diagram illustrating another embodiment of an apparatus 400 that includes one embodiment of the video control module 104. Furthermore, the video control module 104 includes one embodiment of the input reception module 302, the display criteria determination module 304, and the display module 306, that may be substantially similar to the input reception module 302, the display criteria determination module 304, and the display module 306 described in relation to FIG. 3. The input reception module 302 includes a first input port 402 and a second input port 404, and a demultiplexer 405 (or decoder). The video control module 104 also includes a multiplexer 406, a storage module 408 and a user detection module 410.

The first input port 402 may receive a first video input. In some embodiments, the second input port 404 may receive a second video input. Moreover, there may be any number of video input ports. For example, there may be a third input port, a fourth input port, a fifth input port, a sixth input port, and/or additional input ports for receiving video inputs. In one embodiment, the demultiplexer 405 may facilitate reading, decoding, and/or extracting metadata and/or other information (e.g., sideband information) embedded in video streams so that those items may be displayed separate from their corresponding video streams.

The multiplexer 406 may multiplex multiple video inputs. In certain embodiments, the multiplexer 406 may facilitate scaling and/or mixing a number of video input streams. In some embodiments, the multiple video input streams may be routed to the multiplexer 406 instead of directly to the display device 210.

In various embodiments, the storage module 408 may store display criteria for multiple video inputs corresponding to a user. The storage module 408 include any suitable storage device for storing the display criteria, such as the memory 204. In certain embodiments, the user detection module 410 may be used to detect a user and display video inputs based on stored display criteria corresponding to the user.

Figure 5:
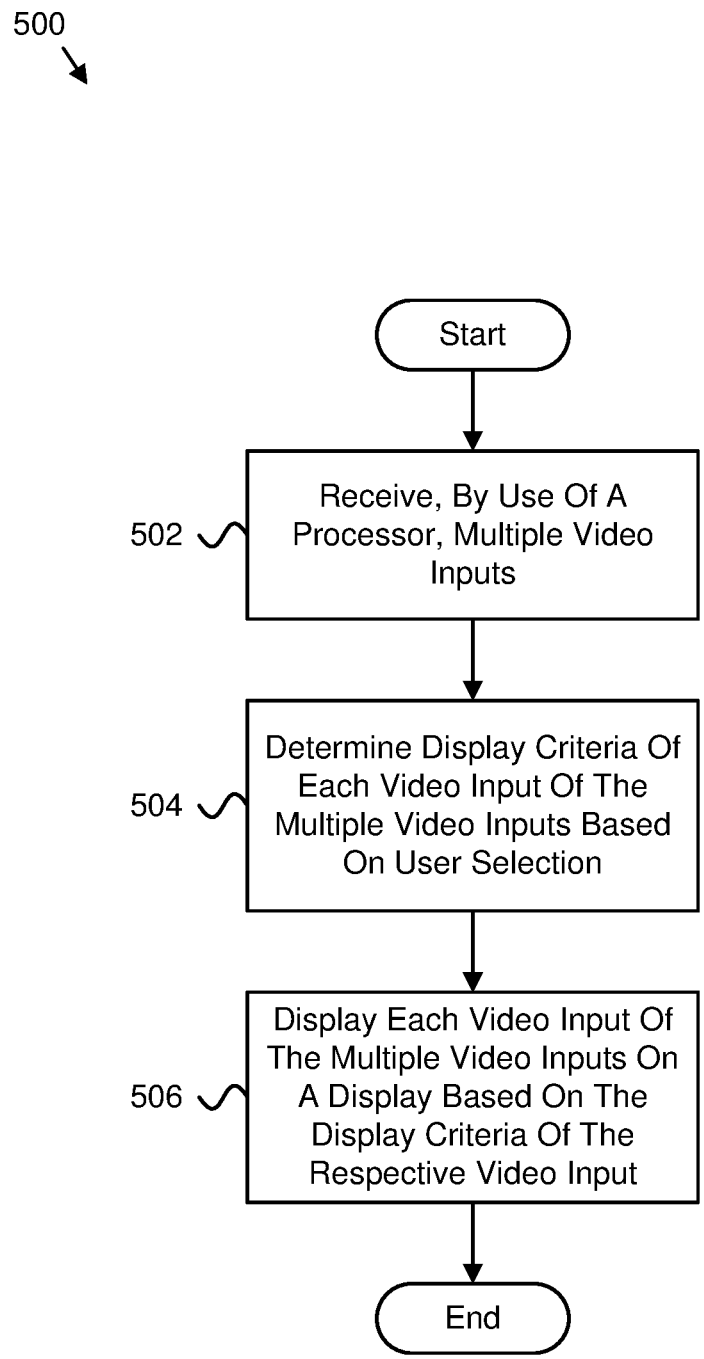
FIG. 5 is a schematic flow chart diagram illustrating an embodiment of a method for displaying video inputs.

FIG. 5 is a schematic flow chart diagram illustrating an embodiment of a method 500 for displaying video inputs. In some embodiments, the method 500 is performed by an apparatus, such as the information handling device 102. In other embodiments, the method 500 may be performed by a module, such as the video control module 104. In certain embodiments, the method 500 may be performed by a processor executing program code, for example, a microcontroller, a microprocessor, a CPU, a GPU, an auxiliary processing unit, a FPGA, or the like.

The method 500 may include receiving 502, by use of a processor (e.g., the processor 202), multiple video inputs. In certain embodiments, the input reception module 302 may receive 502 the multiple video inputs. In some embodiments, receiving 502 the multiple video inputs includes receiving a video input from a digital video input, an analog video input, a tunable input, a data transport interface, a program input, and/or a notification input.

The method 500 may also include determining 504 display criteria of each video input of the multiple video inputs based on user selection. In certain embodiments, the display criteria determination module 304 may determine 504 the display criteria of each video input of the multiple video inputs based on the user selection. In various embodiments, determining 504 the display criteria of each video input of the multiple video inputs based on user selection includes determining a display position, a display size, an order, a transparency, and/or a visibility. In various embodiments, determining 504 the display criteria of each video input of the multiple video inputs based on user selection includes determining the display criteria based on historical data corresponding to user selections.

The method 500 may include displaying 506 each video input of the multiple video inputs on a display (e.g., the display device 210) based on the display criteria of the respective video input, and the method 500 may end. In some embodiments, the display module 306 may display 506 each video input of the multiple video inputs on the display based on the display criteria of the respective video input.

In one embodiment, the method 500 includes combining the multiple video inputs via a multiplexer for display. In some embodiments, the method 500 includes storing the display criteria for the multiple video inputs corresponding to a user. In certain embodiments, the method 500 includes detecting the user and displaying the multiple video inputs based on the stored display criteria corresponding to the user. In such embodiments, detecting the user includes detecting the user via a camera. In some embodiments, detecting the user includes detecting the user via user authentication.

Figure 6:
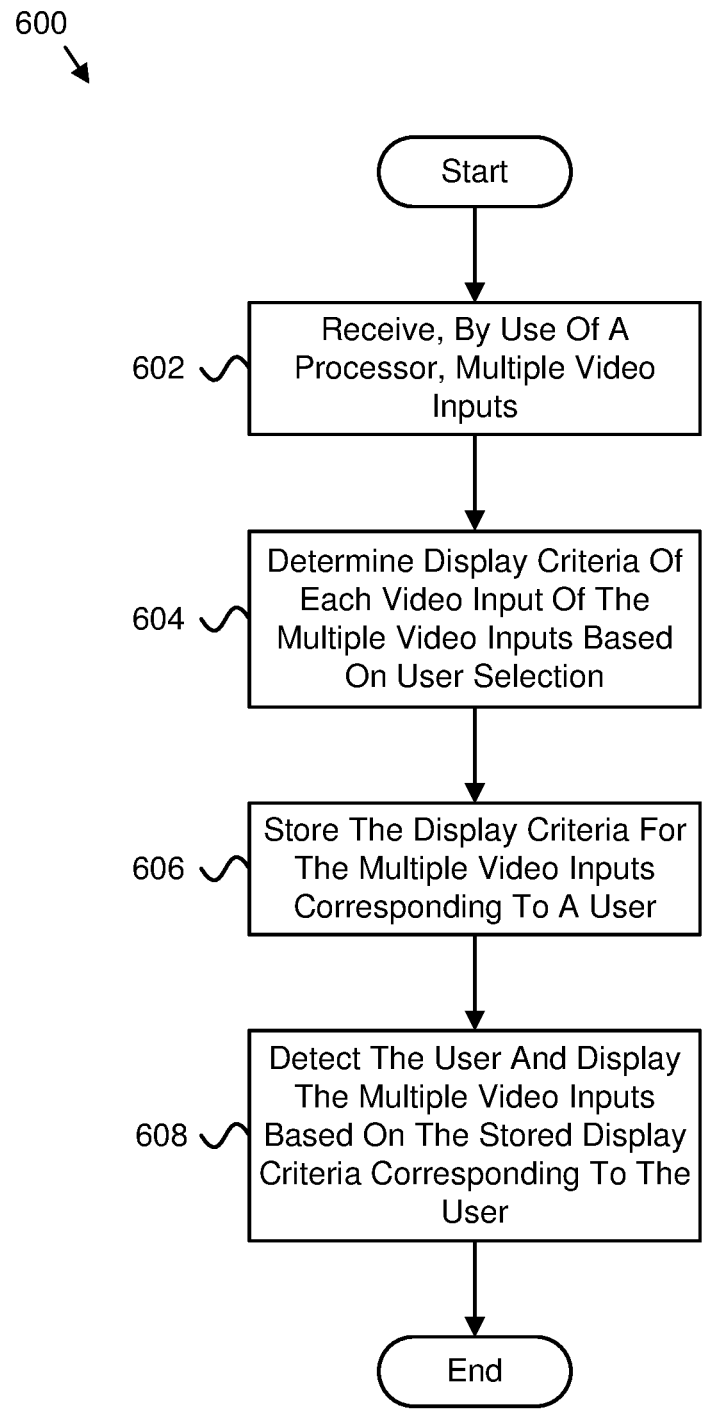
FIG. 6 is a schematic flow chart diagram illustrating another embodiment of a method for displaying video inputs.

FIG. 6 is a schematic flow chart diagram illustrating another embodiment of a method 600 for displaying video inputs. In some embodiments, the method 600 is performed by an apparatus, such as the information handling device 102. In other embodiments, the method 600 may be performed by a module, such as the video control module 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602, by use of a processor (e.g., the processor 202), multiple video inputs. In certain embodiments, the input reception module 302 may receive 602 the multiple video inputs. In some embodiments, receiving 602 the multiple video inputs includes receiving a video input from a digital video input, an analog video input, a tunable input, a data transport interface, a program input, and/or a notification input.

The method 600 may include determining 604 display criteria of each video input of the multiple video inputs based on user selection. In certain embodiments, the display criteria determination module 304 may determine 604 the display criteria of each video input of the multiple video inputs based on the user selection. In various embodiments, determining 604 the display criteria of each video input of the multiple video inputs based on user selection includes determining a display position, a display size, an order, a transparency, and/or a visibility. In various embodiments, determining 604 the display criteria of each video input of the multiple video inputs based on user selection includes determining the display criteria based on historical data corresponding to user selections. In certain embodiments, the method 600 may also include combining the multiple video inputs via a multiplexer for display. In various embodiments, the multiplexer 406 may multiplex the multiple video inputs.

The method 600 may also include storing 606 the display criteria for the multiple video inputs corresponding to a user. In various embodiments, the storage module 408 may store 606 the display criteria for the multiple video inputs corresponding to a user.

The method 600 may include detecting 608 the user and displaying the multiple video inputs based on the stored display criteria corresponding to the user, and the method 600 may end. In some embodiments, the user detection module 410 may detect 608 the user and display the multiple video inputs based on the stored display criteria corresponding to the user. In such embodiments, detecting 608 the user includes detecting the user via a camera. In some embodiments, detecting 608 the user includes detecting the user via user authentication.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
an information handling device comprising:
 a display;
 a processor;
 a camera;
 a first input port;
 a second input port;
 a multiplexer coupled to the first input port and the second input port;
 a memory that stores code executable by the processor to:
  receive, by use of the processor, a plurality of video inputs via the first input port and the second input port, wherein the plurality of video inputs comprises a first video input received by the first input port and a second video input received by the second input port, and the multiplexer multiplexes the first video input and the second video input into a combined video input;
  determine display criteria of each video input of the plurality of video inputs based on user selection in response to a user determining the display criteria for each video input of the plurality of video inputs, wherein the display criteria for each video input of the plurality of video inputs comprises a display position, a display size, an order, a transparency, a visibility, or some combination thereof, and the display criteria is applied to the combined video input to result in a combined video output;
  display, by use of the display, the combined video output, wherein each video input of the plurality of video inputs is displayed based on the display criteria of the respective video input;
  store the display criteria for the plurality of video inputs for the user;
  detect the user via the camera after storing the display criteria for the user and retrieve the display criteria for the detected user; and
  display the combined video output using the stored display criteria for the detected user as a result of detecting the user via the camera, wherein the combined video output is displayed so that each video input of the plurality of video inputs is displayed using the stored display criteria for the user and that video input.

2. The apparatus of claim 1, wherein the code executable by the processor receives a video input from one or more of a digital video input, an analog video input, a tunable input, a data transport interface, a program input, and a notification input.

3. A method comprising:
  receiving, by use of a processor of an information handling device, a plurality of video inputs, wherein the plurality of video inputs is received via a first input port and a second input port of the information handling device, wherein the plurality of video inputs comprises a first video input received by the first input port and a second video input received by the second input port;
  multiplexing, by use of a multiplexer, the first video input and the second video input into a combined video input;
  determining display criteria of each video input of the plurality of video inputs based on user selection in response to a user determining the display criteria for each video input of the plurality of video inputs, wherein the display criteria for each video input of the plurality of video inputs comprises a display position, a display size, an order, a transparency, a visibility, or some combination thereof, and the display criteria is applied to the combined video input to result in a combined video output;
  displaying the combined video output, wherein each video input of the plurality of video inputs is displayed on a display of the information handling device based on the display criteria of the respective video input;
  storing the display criteria for the plurality of video inputs for the user;
  detecting the user via a camera of the information handling device after storing the display criteria for the user and retrieve the display criteria for the detected user; and
  displaying the combined video output using the stored display criteria for the detected user as a result of detecting the user via the camera, wherein the combined video output is displayed so that each video input of the plurality of video inputs is displayed using the stored display criteria for the user and that video input.

4. The method of claim 3, wherein receiving the plurality of video inputs comprises receiving a video input from one or more of a digital video input, an analog video input, a tunable input, a data transport interface, a program input, and a notification input.

5. The method of claim 3, wherein detecting the user comprises detecting the user via user authentication.

6. The method of claim 3, determining the display criteria of each video input of the plurality of video inputs based on user selection comprises determining the display criteria based on historical data corresponding to user selections.

7. A program product comprising a non-transitory computer readable storage medium that stores code executable by a processor, the executable code comprising code to perform:
  receiving, by use of the processor of an information handling device, a plurality of video inputs, wherein the plurality of video inputs is received via a first input port and a second input port of the information handling device, wherein the plurality of video inputs comprises a first video input received by the first input port and a second video input received by the second input port;
  multiplexing, by use of a multiplexer, the first video input and the second video input into a combined video input;
  determining display criteria of each video input of the plurality of video inputs based on user selection in response to a user determining the display criteria for each video input of the plurality of video inputs, wherein the display criteria for each video input of the plurality of video inputs comprises a display position, a display size, an order, a transparency, a visibility, or some combination thereof, and the display criteria is applied to the combined video input to result in a combined video output;
  displaying the combined video output, wherein each video input of the plurality of video inputs is displayed on a display of the information handling device based on the display criteria of the respective video input;
  storing the display criteria for the plurality of video inputs for the user;
  detecting the user via a camera of the information handling device after storing the display criteria for the user and retrieve the display criteria for the detected user; and
  displaying the combined video output using the stored display criteria for the detected user as a result of detecting the user via the camera, wherein the combined video output is displayed so that each video input of the plurality of video inputs is displayed using the stored display criteria for the user and that video input.

8. The program product of claim 7, wherein the executable code further comprises code to perform receiving a video input from one or more of a digital video input, an analog video input, a tunable input, a data transport interface, a program input, and a notification input.

9. The program product of claim 7, wherein the executable code further comprises code to perform detecting the user via user authentication.

* * * * *